US005482395A

United States Patent [19]
Gasparini

[11] Patent Number: 5,482,395
[45] Date of Patent: Jan. 9, 1996

[54] CLIP CONNECTOR FOR JOINING COLUMNS AND BEAMS TO CONCRETE

[75] Inventor: Gino Gasparini, Surrey, Canada

[73] Assignee: Menlo Park Enterprises Ltd., Delta, Canada

[21] Appl. No.: 169,626

[22] Filed: Dec. 20, 1993

[51] Int. Cl.[6] ............................................. F16B 2/20
[52] U.S. Cl. ........................ 403/384; 403/403; 403/405.1; 52/351; 52/359; 52/714
[58] Field of Search ............................. 403/384, 397, 403/395, 403, 205, 335, 405.1, DIG. 10; 52/712, 714, 351, 355, 357, 359

[56] References Cited

U.S. PATENT DOCUMENTS

| | | | |
|---|---|---|---|
| 1,600,551 | 9/1926 | Makowski | 52/357 |
| 3,606,414 | 9/1971 | Haley | 52/714 |
| 4,102,105 | 7/1978 | Taylor et al. | 52/714 X |
| 4,558,838 | 12/1985 | Klein | 403/403 X |
| 4,567,706 | 2/1986 | Wendt | 52/714 X |
| 4,584,811 | 4/1986 | Balinski | 52/714 |
| 4,640,077 | 2/1987 | Hall | 403/347 |
| 4,777,778 | 10/1988 | Taupin | 403/405.1 X |
| 5,226,755 | 7/1993 | Tweedt | 403/205 |

FOREIGN PATENT DOCUMENTS

| | | |
|---|---|---|
| 1134162 | 10/1982 | Canada . |
| 1264957 | 1/1990 | Canada . |
| 2008198 | 7/1990 | Canada . |
| 1280006 | 2/1991 | Canada . |
| 2052996 | of 1992 | Canada . |
| 1296501 | 3/1992 | Canada . |
| 2030101 | 5/1992 | Canada . |
| 1304595 | 7/1992 | Canada . |
| 1308271 | 10/1992 | Canada . |
| 2119827 | 11/1983 | United Kingdom ............ 52/714 |

Primary Examiner—Eric K. Nicholson
Assistant Examiner—Harry C. Kim
Attorney, Agent, or Firm—Foley & Lardner

[57] ABSTRACT

A clip connector for joining column and beam members to concrete building panels is non-corrosive, and does not require bolts or pins to pass into the concrete panels. The connector is a non-corrosive steel clip having a substantially angular shape with two flanges, one flange substantially straight, and the other flange divided into a first portion and a second portion, the first portion having a lip at the end thereof for containment within a column or beam section, the second portion having a bend therein to extend through an aperture in the column or beam section, the second portion terminating in a hook for engaging a reinforcing member in a concrete building panel.

5 Claims, 1 Drawing Sheet

CLIP CONNECTOR FOR JOINING COLUMNS AND BEAMS TO CONCRETE

TECHNICAL FIELD

The present invention relates to the mounting of concrete wall panels and more specifically to a non-corrosive steel clip connector incorporated in a concrete building panel for mounting the panel.

BACKGROUND ART

Concrete building panels of many different types which includes concrete with different types of facings thereon are used for wall panels, floor panels, roof panels, and the like. Some of these panels include provision for insulation and waterproofing. In almost all cases it is necessary to have a supporting beam or column member attached to the back or one side of a panel to tie the panel into the structure of a building. Many different types of connections are available on the market today and are used for walls, both internal and external, floors and roofdecks.

One problem that has come to light with connections used between concrete building panels and building structures is due to corrosive action of precipitation that causes water to pass through porous building panels or, alternatively, pass through cracks between wall panels. Presently connections used between building panels and structures are generally made out of galvanized sheet steel members. However, actual connections from the galvanized sheet steel members to either anchors in the panels or to the beam and column members are often made by pins or bolts and corrosion can occur either at the hole drilled in the galvanized sheet steel members, the anchors, the beam and column members the bolts themselves. Thus, there is a need for a clip connector to join a concrete panel to a column or beam member which does not corrode and does not have bolts or other types of connections which corrode.

DISCLOSURE OF INVENTION

It is an aim of the present invention to provide a clip connector for joining column and beam members to concrete building panels which does not corrode. Furthermore, it is another aim to provide a clip connector which does not have to be bolted or pinned to either column or beam members or to the building panels. It is a further aim to provide a clip connector which is also able to be used when a water barrier membrane is necessary between concrete building panels and steel column or beam members.

The present invention provides a clip connector for joining columns and beams to concrete building panels comprising: a non-corrosive steel clip having a substantially angular shape with two flanges, one flange substantially straight, and the other flange divided into a first portion and a second portion, the first portion of the other flange having a lip at the end thereof for containment within a column or beam section, the second portion of the other flange having a bend therein to extend through an aperture in the column or beam section, the second portion terminating in a hook means for engaging a reinforcing member in a concrete building panel.

In another embodiment the present invention also provides a connector assembly for concrete building panels comprising: a C-shaped steel channel member having a center web and two flat flanges, each of the flanges terminating in an opposing lip, one of the flanges being an adjacent flange and having a plurality of spaced apart apertures therein for receiving connector clips, and non-corrosive steel connector clips for each of the plurality of apertures, each of the clips having a substantially angular shape with two angle flanges, a first angle flange substantially flat to rest against the center web of the channel member, and a second flange divided into a first portion and a second portion, the first portion being flat to rest against the adjacent flange between the center web and the lip of the channel member, the second portion having a bend therein extending the second portion through one of the plurality of apertures in the adjacent flange of the channel member, the extended second portion terminating in a hook shaped end for engaging a reinforcing member in a concrete building panel with the adjacent flange on the surface of the concrete building panel.

BRIEF DESCRIPTION OF DRAWINGS

In drawings which illustrate embodiments of the present invention.

BEST MODE FOR CARRYING OUT THE INVENTION

Figure 1:
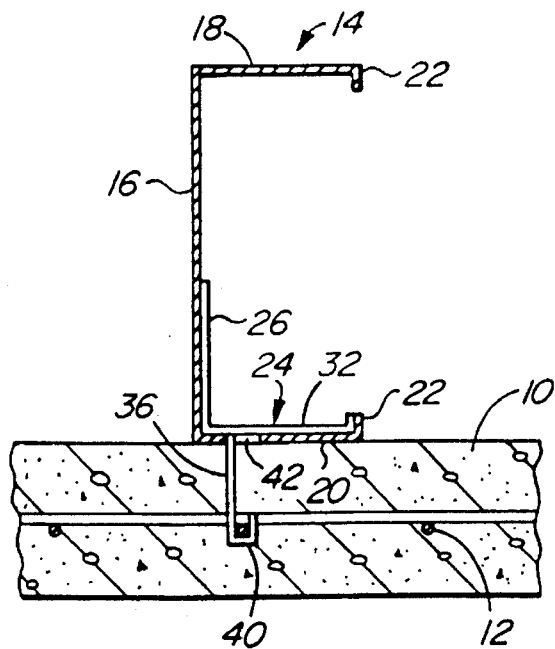
FIG. 1 is a sectional view showing a channel member with a clip connector according to one embodiment of the present invention connecting the channel member to a concrete building panel.
Figure 2:
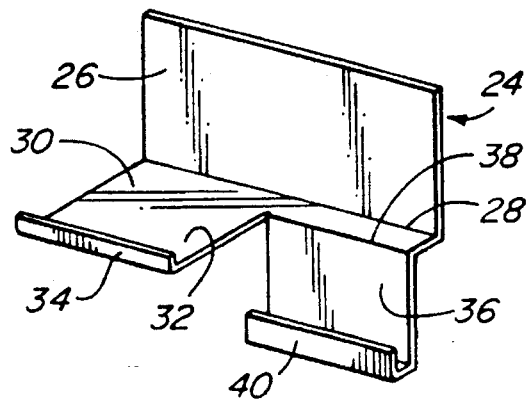
FIG. 2 is an isometric view showing a detail of a clip connector according to an embodiment of the present invention.

Referring now to the drawings, a concrete building panel 10 is shown in FIG. 1 having reinforced steel mesh 12 or reinforcing steel bars in the approximate center. A galvanized steel C-shaped channel member 14, representing a column or beam, has a web 16, a top flange 18 and a bottom flange 20. The C-shaped channel member 14 has inward facing lips 22 at the ends of the top and bottom flanges 18,20. The channel member 14 is shown resting on the surface of the concrete building panel 10 and a clip connector 24 is shown to secure the channel member 14 to the concrete building panel 10. Details of this clip connector 24 are shown in FIG. 2. The clip connector 24 is substantially right angle shaped and made of a non-corrosive sheet steel, preferably stainless steel. A first flange 26 extends from the angle corner 28 and when fitted to the channel member 14 rests adjacent the web 16. A second flange 30 is divided into two portions, a first portion 32 extends from the angle corner 28, substantially perpendicular to the first flange 26, and terminates at a lip 34. This first portion 32 rests on the bottom flange 20 of the channel member 14 between the web 16 and the inward facing lip 22. The first portion 32 is an exact fit in the channel member 14 and thus cannot move sideways.

A second portion 36 of the second flange 30 has a right angle bend 38 and extends parallel to the first flange 26 terminating in a hook 40. As shown in FIG. 1, the second portion 36 of the second flange 30 extends through a slot 42 formed in the bottom flange 20 of the channel member 14. The second portion 36 extends into the concrete building panel 10 and the hook 40 engages with the reinforced steel mesh 12 within the concrete building panel 10.

As the clip connector 24 is made of a non-corrosive steel, it does not rust should water seep in between the concrete building panel 10 and the channel member 14. The channel member 14 is generally made of galvanized sheet steel and therefore corrosion does not occur. The slot 42 formed in the bottom flange 20 of the channel member 14, for the second portion 36 of the second flange 30 of the clip connector 24 to pass through, has the edges of the slot protected from corrosion.

Figure 3:
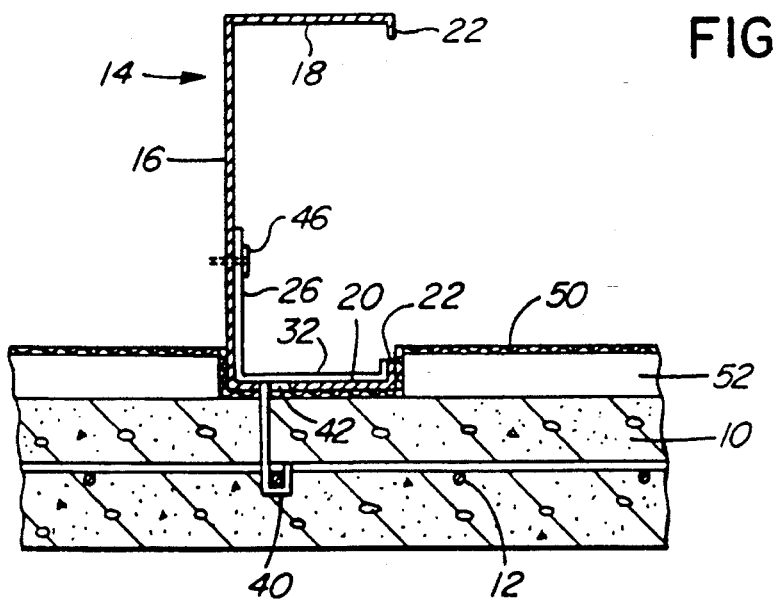
FIG. 3 is a sectional view similar to that shown in FIG. 1 with the addition of a water barrier membrane positioned between the channel member and the concrete building panel.

The clip connector 24 is placed within the channel member 14 as shown in FIG. 1 prior to the concrete building panel 10 being formed. The clip connector 24 is clamped in some manner to the channel member 14 to hold it in position while the concrete building panel is being made. After the concrete has hardened, then there is no necessity to have the clip connector 24 held to the channel member 14 as the concrete holds it in position and provides a firm connection between the channel member 14 and the concrete panel 10. In FIG. 3 there is shown a machine screw or bolt 46 which connects the first flange 26 of the clip connector 24 to the web 16 of the channel member 14. The bolt 46 passes through holes in both the first flange of the clip connector 24 and the web 16 of the channel member at a location that is well away from the concrete interface between the channel member 14 and the building panel 10. This is not a location that is generally affected by water seepage and thus does not corrode.

A water barrier membrane 50 is shown in FIG. 3 having a rain screen cavity 52 generally about one half inch in depth. The membrane 50 is sandwiched between the lower flange 20 of the channel member 14 and the face of the concrete building panel 10. A slot (not shown) is cut in the membrane 50 for the second portion 36 of the second flange 30 of the clip connector 24 to pass therethrough.

The size of the clip connectors can vary depending on the requirements, however, for wall panels the clip connectors are generally about three inches long, with both the flanges about one and one-half inches wide. The second portion 36 of the second flange 30 extends down approximately an inch to engage the reinforced steel mesh 12 within the panel 10.

Various changes may be made to the invention disclosed herein without departing from the scope of the present invention which is limited only by the following claims.

The embodiments of the present invention in which an exclusive property or privilege is claimed are defined as follows:

1. A connector assembly for concrete building panels comprising:

a C-shaped steel channel member having a center web and two flat flanges, each of the flanges terminating in an opposing lip, one of the flanges being an adjacent flange and having a plurality of spaced apart apertures therein and non-corrosive steel connector clips for each of the plurality of apertures, each of the clips having a substantially angular shape with two angle flanges, a first angle flange substantially flat to rest against the center web of the channel member and a second flange divided into a first portion and a second portion, the first portion being flat to rest against the adjacent flange between the center web and the lip of the channel member, the second portion having a bend therein extending the second portion through one of the plurality of apertures in the adjacent flange of the channel member, the extended second portion terminating in a hook shaped end for engaging a reinforcing member in a concrete building panel with the adjacent flange on the surface of the concrete building panel.

2. The connector assembly according to claim 1 wherein the non-corrosive steel connector clips are made of stainless steel.

3. The connector assembly according to claim 1 including a water resistant membrane extending under the adjacent flange of the channel member having the plurality of apertures therein, the membrane sandwiched between the surface of one of the concrete building panels and the adjacent flange of the channel member.

4. The connector assembly according to claim 1 including holding means to hold each of the steel connector clips to the channel member before the concrete building panels are formed.

5. The connector assembly according to claim 4 wherein the holding means comprises at least one bolt between the first flange of each of the steel connector clips and the web of the channel member located away from the surface of each of the concrete building panels.

* * * * *